United States Patent
Kozloski et al.

(10) Patent No.: US 10,589,173 B2
(45) Date of Patent: Mar. 17, 2020

(54) CONTEXTUAL AND DIFFERENTIATED AUGMENTED-REALITY WORLDS

(71) Applicant: International Business Machines Corporation, Armonk, NY (US)

(72) Inventors: James R. Kozloski, New Fairfield, CT (US); Michael S. Gordon, Yorktown Heights, NY (US); Ryan T. Gordon, Yorktown Heights, NY (US); Kevin W. Brew, Albany, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/815,770

(22) Filed: Nov. 17, 2017

(65) Prior Publication Data

US 2019/0151757 A1 May 23, 2019

(51) Int. Cl.

| | |
|---|---|
| A63F 13/00 | (2014.01) |
| A63F 13/52 | (2014.01) |
| A63F 13/30 | (2014.01) |
| A63F 13/216 | (2014.01) |
| G06F 3/01 | (2006.01) |
| G06F 16/9537 | (2019.01) |
| A63F 13/795 | (2014.01) |
| A63F 13/25 | (2014.01) |
| A63F 13/65 | (2014.01) |
| A63F 13/217 | (2014.01) |

(52) U.S. Cl.
CPC ............ *A63F 13/52* (2014.09); *A63F 13/216* (2014.09); *A63F 13/25* (2014.09); *A63F 13/30* (2014.09); *A63F 13/65* (2014.09); *A63F 13/795* (2014.09); *G06F 3/011* (2013.01); *G06F 3/015* (2013.01); *G06F 16/9537* (2019.01); *A63F 13/217* (2014.09)

(58) Field of Classification Search
None
See application file for complete search history.

(56) References Cited

U.S. PATENT DOCUMENTS

| | | | |
|---|---|---|---|
| 5,819,295 A * | 10/1998 | Nakagawa | ............. G06F 16/93 |
| 7,056,216 B2 | 6/2006 | Ohshima | |
| 7,743,330 B1 | 6/2010 | Hendricks et al. | |
| 8,386,918 B2 | 2/2013 | Do et al. | |
| 8,502,835 B1 | 8/2013 | Meehan | |

(Continued)

FOREIGN PATENT DOCUMENTS

WO 2015192208 A1 12/2015

OTHER PUBLICATIONS

Hwang et al., "The Effect of Human Factors on User Usability of a Customized Augmented Reality English Learning System", Proceedings of the 23rd International Conference on Computers in Education, Nov. 30-Dec. 4, 2015, 13 pages.

(Continued)

*Primary Examiner* — Paul A D'Agostino
(74) *Attorney, Agent, or Firm* — Scott S. Dobson (57) ABSTRACT

A cohort associated with a user is identified. A virtual object is generated according to the cohort. An augmented reality setting of a location is generated in relation to the user. A context of the location is determined. The virtual object is modified in the augmented reality setting according to the context and the cohort.

15 Claims, 7 Drawing Sheets

(56) References Cited

U.S. PATENT DOCUMENTS

| | | | |
|---|---|---|---|
| 8,615,479 B2 | 12/2013 | Jung et al. | |
| 8,938,776 B2 | 1/2015 | Meserth et al. | |
| 9,211,077 B2 | 12/2015 | Jung et al. | |
| 9,220,985 B1 | 12/2015 | Auterio et al. | |
| 9,352,216 B2 | 5/2016 | Mullen | |
| 9,418,368 B2 | 8/2016 | Jung et al. | |
| 10,037,077 B2 | 7/2018 | Auten et al. | |
| 2005/0050073 A1* | 3/2005 | Demiroski | G06F 16/178 |
| 2013/0024485 A1* | 1/2013 | Ohnishi | G06F 16/1847 707/822 |
| 2013/0044128 A1 | 2/2013 | Liu et al. | |
| 2014/0122621 A1* | 5/2014 | Feller | G06Q 10/107 709/206 |
| 2014/0136985 A1* | 5/2014 | Albir | H04W 4/21 715/748 |
| 2014/0188946 A1* | 7/2014 | Hartman | G06F 16/9024 707/805 |
| 2014/0223345 A1* | 8/2014 | Tetali | G06F 3/0482 715/769 |
| 2015/0088817 A1* | 3/2015 | Dwan | G06F 16/16 707/610 |
| 2015/0121298 A1* | 4/2015 | Ma | G06F 3/0488 715/784 |
| 2015/0134751 A1* | 5/2015 | Meyers, Jr. | H04L 51/08 709/206 |
| 2015/0199754 A1 | 7/2015 | Greystoke et al. | |
| 2017/0084082 A1 | 3/2017 | McTaggart et al. | |
| 2017/0277386 A1* | 9/2017 | Cho | H04B 1/40 |
| 2018/0335901 A1* | 11/2018 | Manzari | G06F 3/0482 |
| 2019/0088030 A1 | 3/2019 | Masterson et al. | |

OTHER PUBLICATIONS

Celentano et al., "Observing and Adapting User Behavior in Navigational 3D Interfaces", AVI 2004, Gallipoli (LE), Italy, Copyright 2004 ACM, 8 pages.

Balint et al., "Augmented Reality and Image Recognition Based Framework for Treasure Hunt Games", 2012 IEEE 10th Jubilee International Symposium on Intelligent Systems and Informatics, Subotica, 2012, 6 pages.

Hindy, "10 best augmented reality apps and AR apps for Android", Android Authority, Aug. 11, 2017, 11 pages. http://www.androidauthority.com/best-augmented-reality-apps-and-ar-apps-for-android-584616/.

Coday, "Playing Pokemon Go as Someone With a Physical Disability", The Mighty, Jul. 13, 2016, © 2017 Mighty Proud Media, Inc., 12 pages. https://themighty.com/2016/07/playing-pokemon-go-as-someone-with-a-physical-disability/.

List of IBM Patents or Patent Applications Treated as Related, dated Sep. 18, 2019, 2 pages.

Kozloski et al, "Contextual and Differentiated Augmented-Reality Worlds", U.S. Appl. No. 16/575,514, filed Sep. 19, 2019.

* cited by examiner

CONTEXTUAL AND DIFFERENTIATED AUGMENTED-REALITY WORLDS

BACKGROUND

The present disclosure relates to augmented reality, and more specifically, to differentiating augmented reality experiences according to characteristics of the user and the location.

Augmented reality (AR) systems provide a view of a live real-world environment with virtual additions, or "augmentations," which may be computer-generated or extractions of real-world sensory input. Many AR techniques work in real-time and may be immersive, providing contextual data, interactive gameplay, or instruction for a user. Many modern mobile devices are able to generate AR settings for various uses.

SUMMARY

According to embodiments of the present disclosure, a method of creating differentiated augmented reality settings is described. A cohort associated with a user is identified. A virtual object is generated according to the cohort. An augmented reality setting of a location is generated in relation to the user. A context of the location is determined. The virtual object is modified in the augmented reality setting according to the context and the cohort.

A computing system and computer program product can embody the method and structures of the disclosure. The computing system can comprise a network, a memory configured to store context and cohort data, and a processor in communication with the memory. The computing system can be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to augmented reality, more particular aspects relate to differentiating augmented reality experiences according to characteristics of the user and the location. While the present disclosure is not necessarily limited to such applications, various aspects of the disclosure may be appreciated through a discussion of various examples using this context.

Popular mobile Augmented Reality (AR) experiences, such as mobile gaming, provide users with motivation to engage in physical activity and opportunities for social interactions. However, the nature of these games can lead to the exclusion of some gamers. Existing AR systems failure to account for the potential physical and cognitive limitations of some users, making the games unenjoyable or prohibitively difficult for some players.

Disclosed herein is a system, method, and computer program product for creating differentiated augmented reality experiences. The system includes a memory and a processor configured to perform a method as described below.

Disclosed herein is a method for generating and modifying augmented reality settings according to a user's cohort and a location's context. A cohort is identified as being associated with a user. The cohort may be formed according to a social network, a user characteristic, or a group determined according to geographic proximity. The user characteristic may describe a cognitive or physical challenged faced by the user, and the associated cohort may be formed of individuals who face similar challenges. The cohort may be determined, for example, according to a user profile, a social network analysis, detection of an assistive technology, or data received from a biometric sensor. In embodiments, the user characteristic may be part of the user profile.

A virtual object is generated according to the user's cohort. The virtual object may be, for example, a game character, a game target object, a virtual device, a virtual opponent, or a virtual collaborator. In embodiments, the virtual object may be an object of desire, which a user would pursue as part of gameplay.

A context of the real-world location the user occupies is determined and an augmented reality setting of the location is generated in relation to the user and the context. The context may be, for example, elevation or altitude and latitude/longitude of the location, the weather associated with the location, a terrain characteristic of the location, a current time of day, or a current level of illumination at the location. In embodiments, the system may further comprise an infrared sensor, which may provide additional context information of the location, such as providing data on obstacles at the location when the level of illumination falls below a predetermined threshold. In embodiments, a drone may be dispatched to provide aerial context of the location or a global positioning system (GPS) integrated with the AR device or system may provide location context information.

The virtual object is positioned in the augmented reality setting according to the context and the cohort. The virtual object may have a location, a path and a speed. The path and speed of the virtual object may be variable and determined according to the cohort. The nature and presentation of the virtual object may be determined according to cohort. In embodiments, different cohorts may engage in different configurations of gameplay and interact with different renderings of virtual objects. Different cohorts may have different settings regarding the placement of virtual objects with consideration to real world obstacles. Real-world obstacles may be processed by the system as a component of the location context.

In embodiments, a second user may be detected in near proximity to a first user. Each of the first user and the second user may be identified as being associated with a first cohort, and the second user only may be further identified as being associated with a second cohort. For example, the first and second user may each be identified as being associated with a first cohort according to a shared social network group. The second user may be further identified as being associated with a second cohort according to a user characteristic in the second user's profile, e.g., the second user may use a wheelchair for mobility.

The virtual object may be modified in the augmented reality setting, perceived by the first and second user using their respective AR devices, according to the context and the second cohort. Referring again to example above, the first and second user are each associated with a first cohort. The virtual object may be generated and positioned according to the first cohort. In this example the first cohort is a social network group, and the first and second user may be engaged in a competitive game through the social network group. The first and second user may be competing to collect the virtual object. If the virtual object is placed with only consideration to the first cohort, it may be placed, for example, on a set of stairs, and thus be inaccessible to the second user, who relies on a wheelchair. The disclosed system will detect that the second user, while sharing the first cohort with the first user and engaging in shared gameplay with the first user, is also associated with the second cohort, e.g., using a wheelchair. The system may accordingly reposition the virtual object in the augmented reality setting, with consideration to the context of the real world location, e.g., the placement of real world stairs, so that the virtual object is equally accessible to both the first and second users.

In embodiments, additional virtual objects may be generated. The additional virtual objects may be positioned in the augmented reality setting according to a location context and a user cohort. The additional virtual objects may serve, for example, to increase the density of the virtual objects in a given location. In embodiments, a virtual attribute of the virtual object may be changed according to a second (or third, etc.) cohort of a user. The virtual attribute may be, for example, an object behavior, an object response, or the rendered "weight" of a virtual object (e.g., experienced by the user through haptics or the object's perceived "resistance" to being lifted/moved, etc.).

In embodiments, a second user may be detected in near proximity to a first user and that second user may be identified as not being associated with the first cohort with which the first user is associated. The second user may be associated with a second cohort, and the first user determined to not be associated with the second cohort. Accordingly, a second virtual object may be generated, according to the second cohort, and positioned in a second augmented reality setting, experienced by the second user, according to the location context and the second cohort. When the first and second user are in near proximity to one another in the real world, and thus each of the first and second augmented reality settings is being displayed according to the same real world location and location context, an inconsistency between the first and second augmented reality setting may be predicted. The first and second virtual object may be regularized according to the predicted inconsistency.

For example, a first and second user may converge on a common location, each in pursuit of a different virtual object according to the first and second cohort. The first user may be in pursuit of a first object, e.g., a cup, and the second user may be in pursuit of a second object, e.g., a sword. Due to the first and second augmented reality settings being generated according to different cohorts, each user may not be able to see the object pursued by the other user, despite being able to see one another in the real world. In this example, the first and second user may be able to see one another and observe that each is participating in an augmented reality game, but the first user will be unable to see the sword and the second user will be unable to see the cup. Rather than leaving both users to wonder if their gameplay is compromised (e.g., why the first user is able to interact with a virtual object not appearing on the second user's augmented reality setting), the inconsistency between the first and second augmented reality setting may be predicted, and the first and second object regularized. For example, the sword may come into view for the first user and the cup may come into view for the second user. In embodiments, a user may not be able to interact with objects intended for gameplay in cohorts which the user is not a part of, and regularization of the objects may encourage real world interaction between users of different cohorts.

In embodiments, the user may be traveling along a course and a virtual object may be positioned according to a checkpoint associated with the course. For example, a user may be hiking on a trail, and virtual objects may be placed periodically along the trail to provide the user with guidance and motivation. Alternatively, a virtual object may be traveling along a predetermined path in an augmented reality setting, the path correlating to a trail in a real world location, at a predetermined speed. The user may hike or run the real world trail by following or chasing the virtual object in the augmented reality setting. In embodiments, virtual attributes of the virtual objects may be adjusted according to a user's cohort and characteristics. For example, virtual objects placed as checkpoints along a trail may be placed closer together for a user in a cohort associated with visual deficiencies or a user having historical data indicating the user benefits from greater reinforcement. As another example, the speed of a virtual object traveling along a predetermined path may be reduced for a user in a cohort associated with respiratory problems, or the path of the virtual object may be adjusted to allow to user to travel at a lower altitude.

In embodiments, historical data associated with the location and the cohort may be collected and saved. A virtual object in the augmented reality setting may be positioned according to the historical data. For example, by collecting and analyzing historical data, it may be determined that users of a particular cohort tend to congregate in a particular area. A group of users may belong to a cohort of coworkers, and may tend to congregate in a break area where they work, or at a nearby restaurant. The density of virtual objects may be accordingly increased or decreased at such a location, according to a set of system settings. The set of system settings may be set to encourage socialization among the coworkers, in which case the density of virtual objects may be increased at points of congregation. Alternatively, the settings may be set to encourage increased physical activity by the members of the cohort, in which case the virtual objects may be dispersed to encourage members of the cohort to travel from points of congregation.

Figure 1:
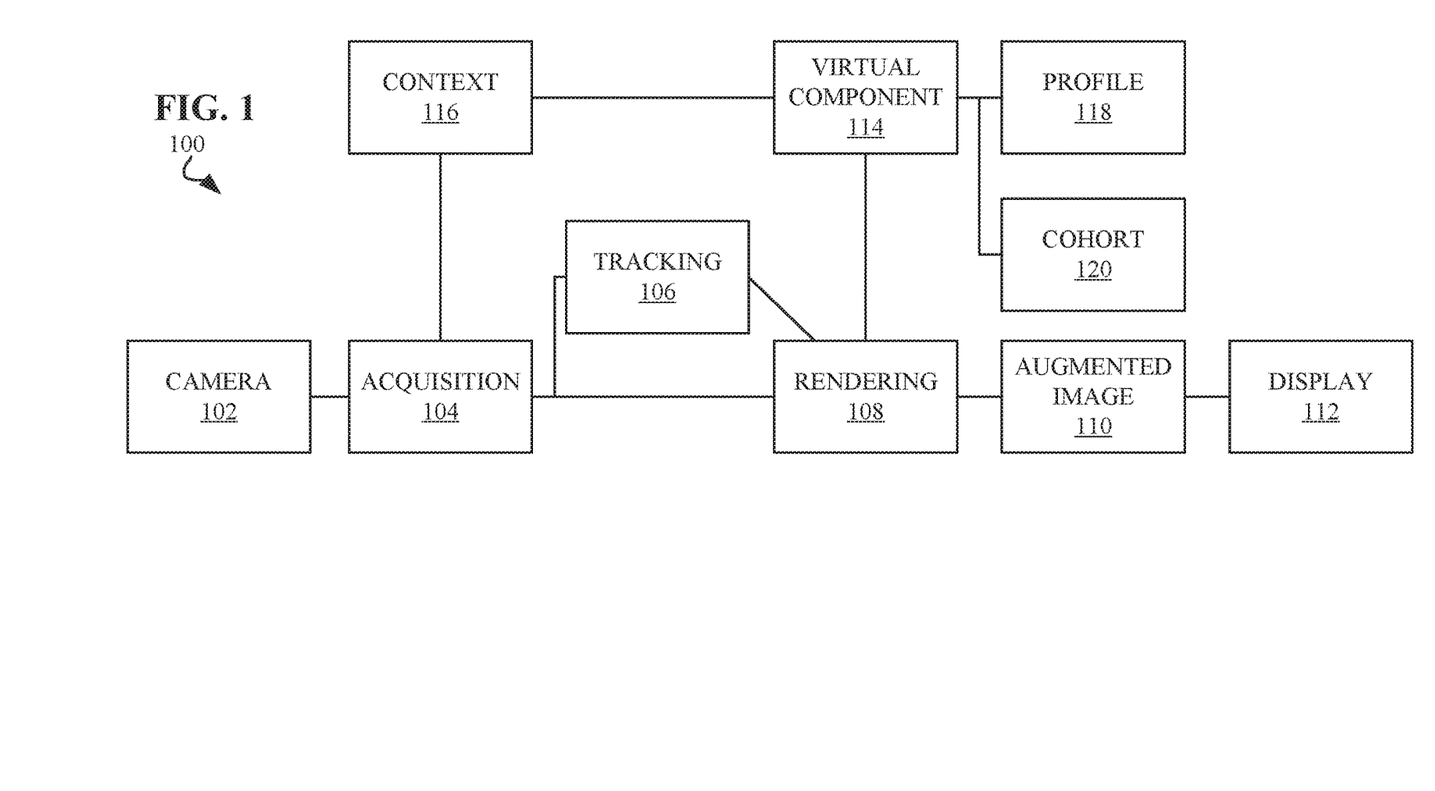
FIG. 1 depicts a block diagram of an example augmented reality system, according to embodiments of the present disclosure.

Referring now to FIG. 1, depicted is a block diagram of an example augmented reality system 100, according to embodiments of the present disclosure. In embodiments, components of the block diagram may be modules in a processor, data items stored in a database or memory, or input/output devices.

The system 100 comprises sensory input devices, such as camera 102 depicted in this example. In embodiments, the sensory input device may be a camera, a microelectromechanical sensor (e.g., an accelerometer, a GPS, a compass), etc. Camera 102 may include infrared imaging. Camera 102 may be a remote device, e.g., a drone.

The sensory input device, such as camera 102, may feed sensory input data into an acquisition module 104. The acquisition module 104 may serve to convert the sensory data acquired by camera 102 into a format that may be handled by the rendering module 108 to produce the augmented image 110.

The acquisition module 104 may feed data into a context module 116. The context module 116 may take image and other sensor date processed by acquisition module 104 and extract and store relevant context data regarding the real-world location. Determining context data may include identifying obstacles and hazards, measuring inclines and ambient light, etc.

The context module 116 may provide data to a virtual component module 114. The virtual component module 114 may additionally receive input from profile data 118 and cohort data 120. In embodiments, profile data 118 and cohort data 120 may be acquired separately or from the same source. Profile data 118 and cohort data 120 may be stored on an integrated database or memory, or may be stored remotely and retrieved by the virtual component module 114 as necessary. In embodiments, profile data 118 may be input by the user or extracted from another source, e.g., a social network profile. Cohort data 120 may be predetermined and entered as system settings, or may be determined according to profile data 118. Profile data 118 and cohort data 120 may include historical data relating to a user's gameplay, use of the AR system, changes to the system settings, feedback, etc.

The acquisition module 104 may provide data to a tracking module 106. The tracking module 106 may provide real-time data related the user's changing view of the real-world setting and movement of real-world objects in the setting.

A rendering module 108 may receive data from the acquisition module 104, from the tracking module 106, and from the virtual component 114. The rendering module 108 may serve to integrate a virtual component, e.g., a virtual object, into a real world scene provided by the acquisition module 104. Data from the tracking module 106 may provide for real-time adjustment to the rendered AR experience based on user or device movement. Data from tracking module 106 may assist in the rendering module 108 in rendering virtual objects in motion, so that the virtual object's path and speed integrate effectively with the real-world setting.

The rendered AR experience may be output by the rendering module 108 as an augmented image 110. The augmented image may be a digital image or projection, or a line-of-sight view of a real world setting, with incorporated or overlaid virtual elements.

The augmented image 110 may be presented to the user via a display 112. The display 112 may be any of an optical projection system, a monitor, a hand held device (e.g., a mobile phone or a tablet), or a display system worn on the body (e.g., a head-mounted display or AR eyeglasses).

Figure 2A:
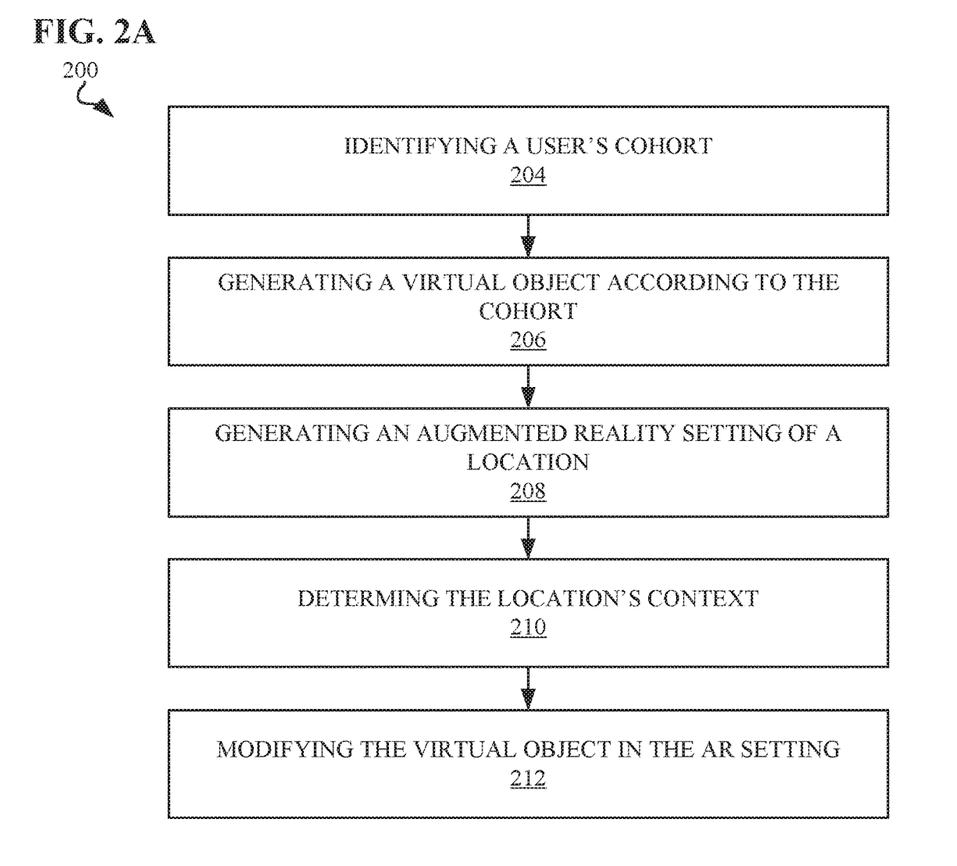
FIG. 2A depicts a flowchart of an example method for rendering a contextual augmented reality experience, according to embodiments of the present disclosure.

Referring now to FIG. 2A, depicted is a flowchart of an example method 200 for rendering a contextual augmented reality experience, according to embodiments of the present disclosure. In embodiments, the method 200 may be performed by one or more processors in an AR device, such as by a system using modules like those depicted in system 100 of FIG. 1. It is to be understood that the steps of the method 200 may be performed in any order, and the order of operations in FIG. 2A is but one example.

At operation 204, a user's cohort is identified. The user's cohort may be any of a social network, a user characteristic (e.g., a player having cognitive or physical challenges), geographic proximity, a common employer or team affiliation, friends, family, etc. The user's cohort may be determined according to a user profile, a social network analysis, detection of an assistive technology (e.g., a wheelchair), detection of biometric sensing (e.g., of tremors or muscle fatigue), etc. For example, a user with muscular dystrophy may be associated with a cohort according to their use of a wheelchair and biometric sensing of periodic respiratory distress (e.g., accelerated heart rate). Another user may also use a wheelchair due to a spinal injury, and thus not have signs of periodic respiratory distress, and may therefore occupy a different cohort.

At operation 206, a virtual object is generated according to the user's cohort. The virtual object may be determined by the system, device, or application the user is accessing the AR experience through, as well as the user's cohort. The user may belong to one or more cohorts, and each of the one or more cohorts may have different configurations for the AR experience, leading to the generation of multiple virtual objects. Each of the multiple virtual objects may be used in the AR setting, or virtual objects from a particular cohort may be prioritized over virtual objects from other cohorts according to the user's settings or other data. For example, a user may belong to a first cohort according to a social network group and a second cohort according to a user characteristic, e.g., the user has Ehlers-Danlos syndrome and is limited to how much walking they can do. Virtual objects associated with the second cohort may be more densely arranged around the user's location, to account for the shorter walking distances suited to the members of the second cohort. In embodiments, the system may monitor the user's gameplay for frequency and duration, and prioritize generation of virtual objects from the second cohort if the user engages in extended gameplay and shows signs of fatigue (e.g., via biometric sensing). In embodiments, multiple virtual objects may be generated for a single cohort.

At operation 208, an augmented reality setting of a real world location is generated. The AR setting may be generated according to a context of the location, determined at operation 210. The context of the location may include what kind of physical location (e.g., indoor or outdoor), elevation (e.g., stairs or an incline), altitude, weather, terrain characteristic (e.g., obstacles or trip hazards), day of the week (e.g., with consideration to expected density of people), time, illumination level, etc.

At operation 212, the virtual objet is positioned in the AR setting according to the context and the cohort. For example, a first user may belong to a first cohort. The first cohort may be associated with users having average health and fitness. Virtual objects generated according to the first cohort may be positioned randomly, e.g., without consideration to elevation or obstacles. A second user may belong to a second cohort. The second cohort may be associated with users having vision related disabilities. Virtual objects generated according to the second cohort may be placed with consideration to illumination level and terrain characteristics, e.g., placed in well-lit areas with few obstacles. Alternatively, virtual objects generated according to the first cohort may be placed in areas with low light, to simulate the challenge faced by users of the second cohort, and/or objects generated according to the first cohort may be partially transparent, or have cloaking or camouflaging characteristics.

Figure 2B:
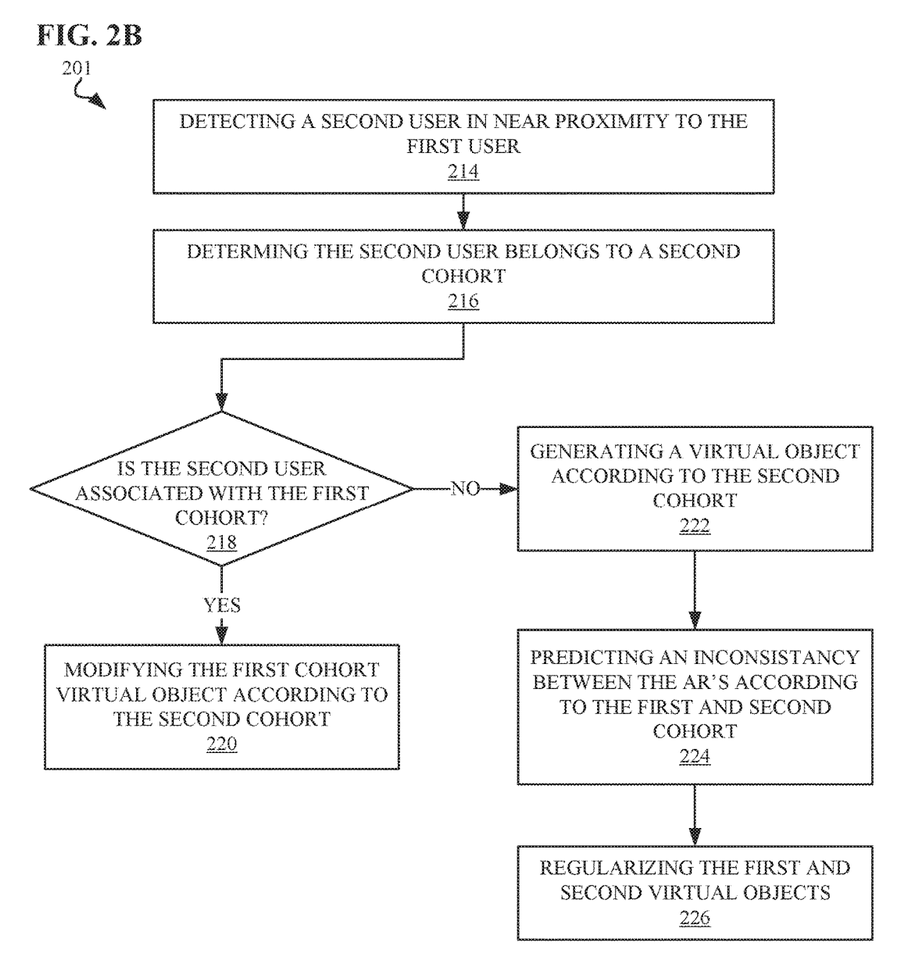
FIG. 2B depicts a flowchart of an example method for rendering contextual and differentiated augmented reality experiences, according to embodiments of the present disclosure.

Referring now to FIG. 2B, depicted is a flowchart of an example method 201 for rendering contextual and differentiated augmented reality experiences, according to embodiments of the present disclosure. It is to be understood that the depicted organization of the method 201 as including only two users as depicted in FIG. 2B is to be non-limiting, as the process may be executed with any number of users and cohorts.

At operation 214, a second user is detected in near proximity to a first user. The first user may be the user of the method 200 in FIG. 2A. The first user may be assumed to belong to a first cohort. Proximity may be determined according to a predetermined threshold, and may be saved in settings for the AR program or application, for the device, or the AR system. Detecting the second user may comprise the first and second user's individual devices searching for signals from other users engaging the same AR program, a central system tracking the locations of users engaging the AR program, use of a device's or system's (GPS), etc.

At operation 216, the second user is determined to belong to a second cohort. In embodiments, the first user may or may not belong to the second cohort. In this example, the second cohort is a cohort associated with the second user but not the first user. At decision block 218, it is determined whether the second user also belongs to the first cohort.

If, at decision block 218, the second user is determined to be associated with the first cohort, and therefore shares a cohort with the first user, then the first virtual object, the virtual object associated with the first cohort, may be repositioned according to the second cohort, shown as at operation 220. For example, each of the first and second user may belong to a first cohort according to a shared social network group. The settings of the first cohort may assume users of average health and fitness, and therefore place virtual objects generated according to the first cohort without consideration to elevation, terrain characteristics, etc. The second user may additionally belong to a second cohort to which the first user does not belong. The settings of the second cohort may be tailored to users who rely upon a wheelchair for mobility, and may cause virtual objects pursued by users of the second cohort to be repositioned, or modified, with consideration to elevation, obstacles, etc.

If, at decision block 218, it is determined that the second user does not belong to the first cohort, and therefore does not share a cohort with the first user, then a second virtual object may be generated according to the second cohort, as at operation 222. In embodiments, the second user may belong to any number of cohorts which the first user does not belong to, and the second virtual object may generated according to any one or any combination of cohorts, according to the second user's settings.

At operation 224, an inconsistency between the AR experiences of the first and second user is predicted according to the configurations of the first and second cohorts. An inconsistency may include any difference between the AR settings and objects experienced by each of the first and second user. The inconsistency may be predicted by the system comparing the rendering of each user's AR experience and determining that a difference exists. For example, a first and second user may be in near proximity to one another such that they share a common real-world setting for their AR experiences. The first user may belong to a first cohort and see a first virtual object positioned in a first location in the real-world setting. The second may belong to a second cohort and see a second virtual object in a second location in the real-world setting, but not the first virtual object. Likewise, the first user may not see the second virtual object. The system may detect that each of the first and second users are seeing a common real-world setting, but with different virtual objects in different locations within the setting.

At operation 226, the first and second virtual objects are regularized. Regularized may be understood to mean smoothing the inconsistency between the two AR experiences, so that users in near proximity to one another may share a common AR experience without compromising the individual tailoring to each user's unique characteristics. To continue the example above, as the system regularizes the two users' AR experiences, the first user may see the second virtual object come into view in the second location. Likewise, the second user may see the first virtual object come into view in the first location. In embodiments, each system may also respond to detecting the other user and receiving the data associated with the other user's cohorts. For example, if the second user belongs to a cohort associated with a physical challenge and the first user does not, the first user's AR experience may incorporate a handicap to simulate the challenge experienced by the second user in engaging with the gameplay. For example, if the second user belongs to a cohort associated with muscle tremors, the first user's device may use haptics to produce a "tremor" in the first user's gameplay. In another example, if the second user belongs to a cohort associated with visual deficiencies, the first user's device or system may darken the AR setting, or give the setting an appearance of being out of focus.

Figure 3A:
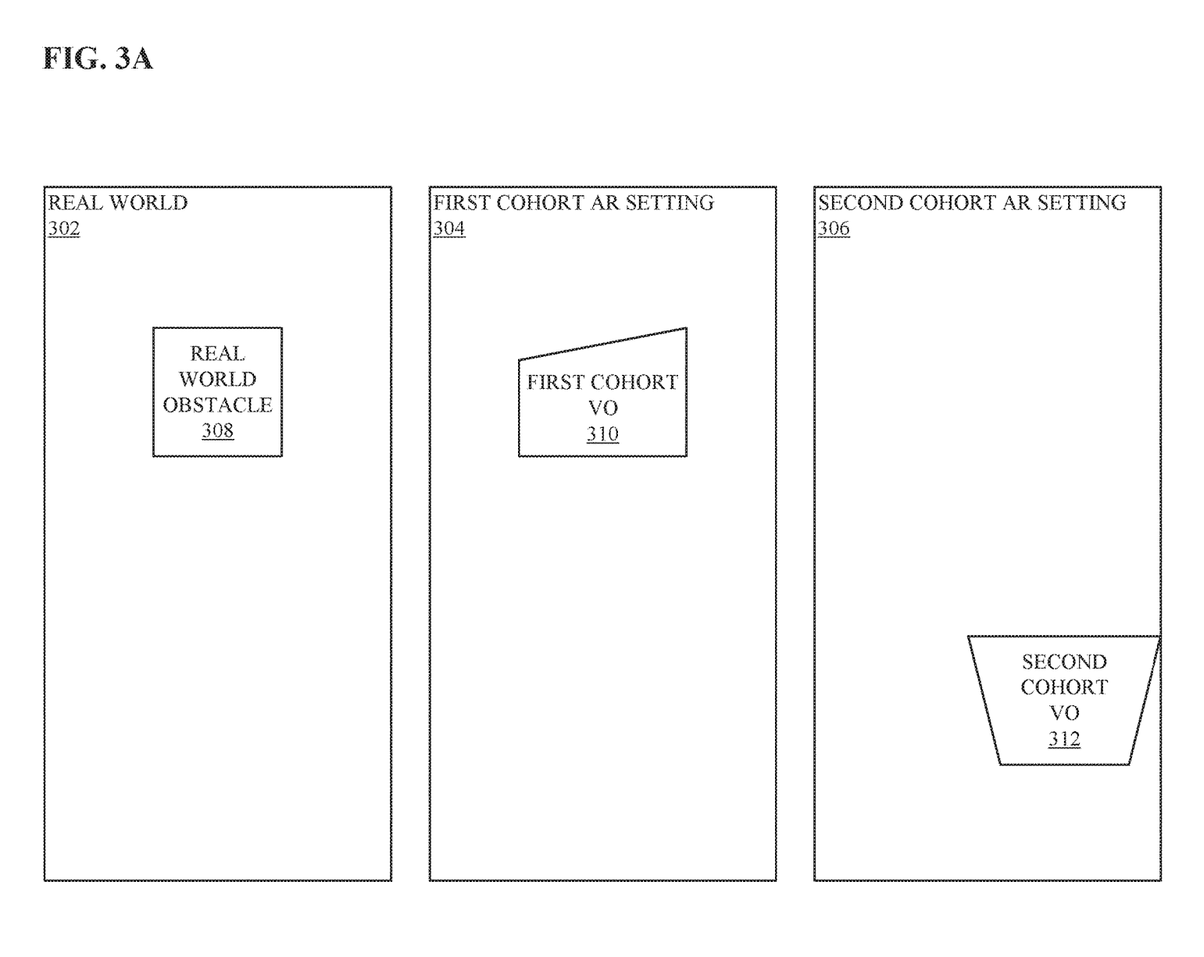
FIG. 3A depicts an example of differentiated augmented reality experiences, according to embodiments of the present disclosure.

FIG. 3A depicts an example of differentiated augmented reality experiences, according to embodiments of the present disclosure. A real world setting 302 is depicted with a real world obstacle 308. A first cohort AR setting 304 is depicted with a first cohort virtual object 310, corresponding in location to the real world obstacle 308. A second cohort AR setting 306 is depicted with a second cohort virtual object 312, not corresponding in location to the real world obstacle 308. First cohort AR setting 304 and second cohort AR setting 306 may both be understood to correspond to real world setting 302.

Figure 3B:
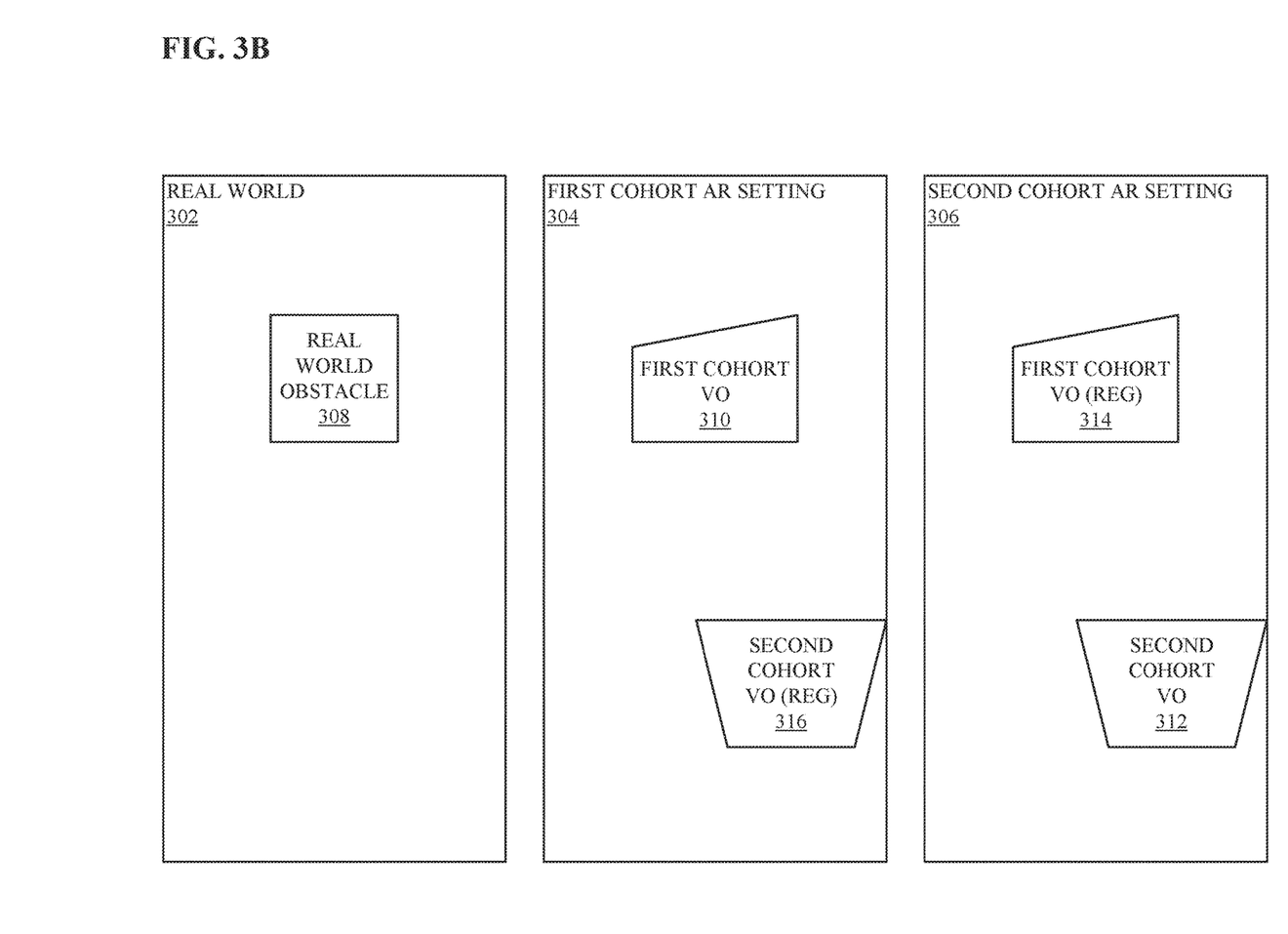
FIG. 3B depicts an example of differentiated augmented reality experiences that have been regularized, according to embodiments of the present disclosure.

FIG. 3B depicts an example of differentiated augmented reality experiences that have been regularized, according to embodiments of the present disclosure. A real world setting 302 is depicted with a real world obstacle 308. A first cohort AR setting 304 is depicted with a first cohort virtual object 310, corresponding in location to the real world obstacle 308 in the real world setting 302. First cohort AR setting 304 may be understood to be an AR setting integrated with real world setting 302. First cohort AR setting 304 may further comprise a regularized rendering 316 of second cohort virtual object 312. Second cohort virtual object 312 may be part of second cohort AR setting 306, which may further comprise a regularized rendering 314 of first cohort virtual object 310.

Figure 4:
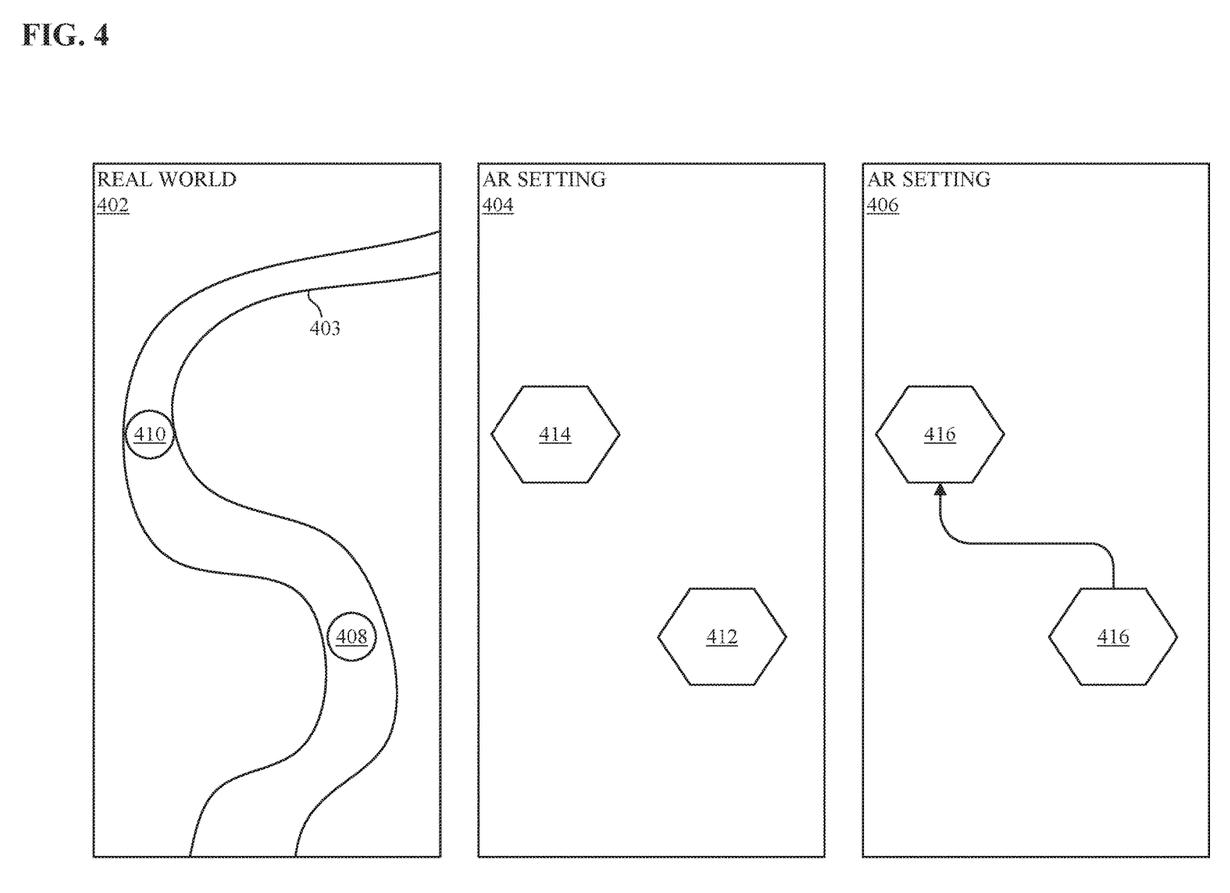
FIG. 4 depicts an example of an augmented reality experience providing course direction, according to embodiments of the present disclosure.

Referring now to FIG. 4, depicted is an example of an augmented reality experience providing course direction, according to embodiments of the present disclosure. A real world setting 402 is depicted, including course 403. Course 403 includes, in this example, two checkpoints 408 and 410. Also depicted are AR settings 404 and 406, which may be understood to correspond to real world setting 402. AR setting 404 depicts two virtual objects, 412 and 414, corresponding in location to real world check points 408 and 410. AR setting 406 depicts a virtual object 416, shown in motion from a point corresponding to check point 408 to a point corresponding to checkpoint 410.

Figure 5:
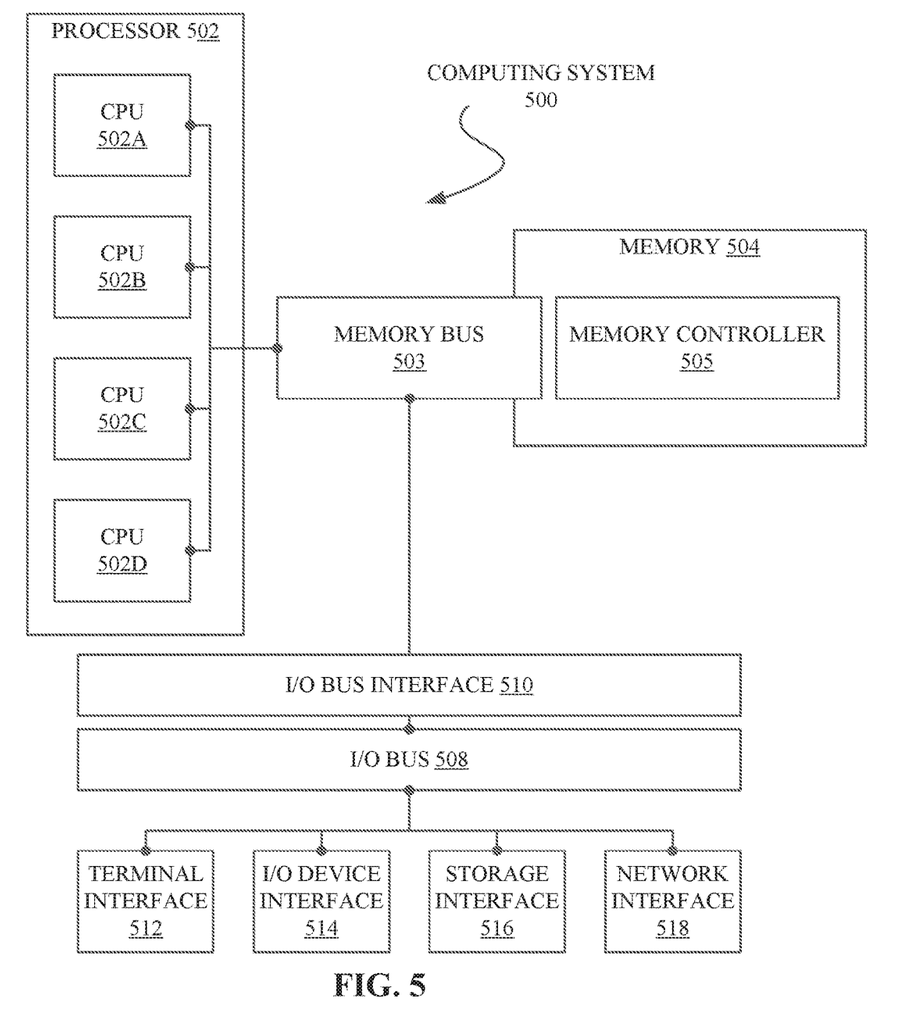
FIG. 5 depicts a high-level block diagram of an example computer system used in implementing one or more of the methods or modules described, in accordance with embodiments of the present disclosure.

Referring now to FIG. 5, shown is a high-level block diagram of an example computer system (i.e., computer) 500 that may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise one or more CPUs 502, a memory subsystem 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface unit 510.

The computer system 500 may contain one or more general-purpose programmable central processing units (CPUs) 502A, 502B, 502C, and 502D, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 500, and may also include the virtual memory of other computer systems coupled to the computer system 500 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface, but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for creating differentiated augmented reality settings comprising:
    a memory; and
    a processor in communication with the memory, wherein the computer system is configured to perform a method, the method comprising:
        identifying a first cohort associated with a first user;
        generating a first virtual object according to the first cohort;
        generating a first augmented reality setting of a location in relation to the first user;
        determining a context of the location;
        modifying the first virtual object in the first augmented reality setting according to the context and the first cohort;
        detecting a second user in proximity to the first user, the second user associated with a second cohort, the second user associated with a second augmented reality setting, the second augmented reality setting having a second virtual object modified according to the second cohort;
        identifying that the first user is not associated with the second cohort;
        predicting an inconsistency between the first and second augmented reality settings; and
        regularizing the first and second virtual objects according to the predicted inconsistency.

2. The system of claim 1, wherein the first cohort is selected from a group consisting of a social network, a user characteristic, and a group determined according to geographic proximity.

3. The system of claim 1, wherein the first cohort is based on a user characteristic that describes a cognitive or physical challenge faced by the user.

4. The system of claim 1, wherein the first virtual object is selected from a group consisting of a game character, a game target object, a virtual device, a virtual opponent, and a virtual collaborator.

5. The system of claim 1, wherein the context is selected from a group consisting of a location elevation, a location altitude, weather associated with the location, a terrain characteristic, a current time of day, and a level of illumination.

6. The system of claim 1, further comprising an infrared sensor, wherein the infrared sensor provides additional context information of the location when a level of illumination falls below a predetermined threshold.

7. The system of claim 1, further comprising a global positioning system, wherein the global positioning system provides additional context information of the location.

8. The system of claim 1, wherein the first cohort is determined according to one selected from a group consisting of a user profile, a social network analysis, detection of an assistive technology, and a biometric sensor.

9. The system of claim 1, wherein the first virtual object has a path and a speed.

10. The system of claim 9, wherein the path and the speed of the first virtual object are determined according to the first cohort.

11. A method of creating differentiated augmented reality settings comprising:
- identifying a first cohort associated with a first user;
- generating a first virtual object according to the first cohort;
- generating a first augmented reality setting of a location in relation to the first user;
- determining a context of the location;
- modifying the first virtual object in the first augmented reality setting according to the context and the first cohort;
- detecting a second user in proximity to the first user, the second user associated with a second cohort, the second user associated with a second augmented reality setting, the second augmented reality setting having a second virtual object modified according to the second cohort;
- identifying that the first user is not associated with the second cohort;
- predicting an inconsistency between the first and second augmented reality settings; and
- regularizing the first and second virtual objects according to the predicted inconsistency.

12. The method of claim 11, further comprising dispatching a drone, wherein the drone provides additional context of the location.

13. The method of claim 11, further comprising determining that the first user is traveling along a course and wherein modifying the first virtual object is further according to a checkpoint associated with the course.

14. The method of claim 11, further comprising obtaining historical data associated with the location and the first cohort and wherein modifying the first virtual object in the first augmented reality setting is further according to the historical data.

15. A computer program product for creating differentiated augmented reality settings, the computer program product comprising a computer readable storage medium having program instructions embodied therewith, wherein the computer readable storage medium is not a transitory signal per se, the program instructions executable by a processor to perform a method comprising:
- identifying a first cohort associated with a first user;
- generating a first virtual object according to the first cohort;
- generating a first augmented reality setting of a location in relation to the first user;
- determining a context of the location;
- modifying the first virtual object in the first augmented reality setting according to the context and the first cohort;
- detecting a second user in proximity to the first user, the second user associated with a second cohort, the second user associated with a second augmented reality setting, the second augmented reality setting having a second virtual object modified according to the second cohort;
- identifying that the first user is not associated with the second cohort;
- predicting an inconsistency between the first and second augmented reality settings; and
- regularizing the first and second virtual objects according to the predicted inconsistency.

* * * * *